United States Patent [19]

Jones

[11] Patent Number: 4,552,372
[45] Date of Patent: Nov. 12, 1985

[54] SCOOTERBOARD

[76] Inventor: Daniel T. Jones, 196-18 116th Ave., St. Albans, N.Y. 11414

[21] Appl. No.: 567,875

[22] Filed: Jan. 3, 1984

Related U.S. Application Data

[63] Continuation-in-part of Ser. No. 343,432, Jan. 28, 1982, abandoned.

[51] Int. Cl.$^4$ .............................................. B62K 9/00
[52] U.S. Cl. ............................................ 280/87.04 R
[58] Field of Search ................. 280/87.04 R, 87.04 A, 280/272; 16/35 R

[56] References Cited

U.S. PATENT DOCUMENTS

| | | | |
|---|---|---|---|
| 161,573 | 1/1951 | De Camp | 280/87.04 R |
| 449,383 | 3/1891 | Rathbun | 280/272 |
| 1,289,361 | 12/1918 | Bastman | 280/87.04 R |
| 1,293,365 | 2/1919 | Dillon | 280/87.04 R |
| 1,387,675 | 8/1921 | Worobow | 280/87.04 R |
| 2,027,254 | 1/1936 | Vogt | 280/87.04 R |
| 2,330,147 | 9/1943 | Rodriguez | 280/87.04 R |
| 2,468,910 | 5/1949 | Zsinor et al. | 280/87.04 R |
| 3,206,790 | 9/1965 | Romay | 16/35 R |
| 3,751,062 | 8/1973 | White, Sr. | 280/87.04 R |
| 4,138,131 | 2/1979 | Sommer | 280/272 |

FOREIGN PATENT DOCUMENTS 2048180A 12/1980 Netherlands ................. 280/87.04 R Primary Examiner—David M. Mitchell
Attorney, Agent, or Firm—Oblon, Fisher, Spivak, McClelland & Maier

[57] ABSTRACT

A scooterboard, including a board supported on a front and rear skate wheel trucks, and wherein the front skate wheel truck is alternatively unlocked or locked by means of a selectively lockable swivelling assembly so as to be free swivelling or stationary, and further including a removable steering post and a removable steering column carried by the scooterboard to allow an operator to select different steering embodiments thereof.

6 Claims, 4 Drawing Figures

SCOOTERBOARD

This application is a continuation in part of application Ser. No. 343,432 filed Jan. 8, 1982 and now abandoned.

BACKGROUND OF THE INVENTION

1. Field of the Invention

This invention relates generally to scootering vehicles, and more particularly, to those upon which a rider stands and steers it directionally while the vehicle scoots along the ground.

2. Description of the Prior Art

It is well-known that numerous scooters have been developed in the past, and which include a front and rear skate truck under opposite ends of a board upon which a rider stands, the front skate truck being controllable for steering into any direction. Generally, scooters made with skate-like trucks are steered by the rider's shifting his weight sidewardly, so as to cause the fixed front wheel truck to turn slightly, as is well-known in roller skate art.

SUMMARY OF THE INVENTION

It is a principal object of the present invention to provide a scooterboard which is selectively steered either in the above-identified manner, or else by the front wheel truck being steered by a directionally fully swivelled steering post.

Another object of the present invention is to provide a scooterboard in which the weight-steered vehicle is controlled either with or without a stationary steering column, which is removably affixed on the vehicle.

Other objects are to provide a scooterboard which is simple in design, inexpensive to manufacture, rugged in construction, easy to use, and efficient in operation.

These and other objects are obtained by a scooterboard including a selectively lockable swivelling mechanism which selectively locks and unlocks the front skate wheel truck for stationary, or free swivelling operation, respectively. A detachable steering post assembly may be used to guidingly swivel the front skate wheel truck when the selectively lockable swivelling mechanism is set so that the front skate wheel truck freely swivels or the rider may steer the scooterboard by displacing his weight thereon when the front skate wheel truck is stationary due to the locking action of the selectively lockable swivelling mechanism, in conjunction with a detachable steering column assembly, the detachable steering post assembly, or with both the steering post assembly and the steering post assembly detached from the scooterboard.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
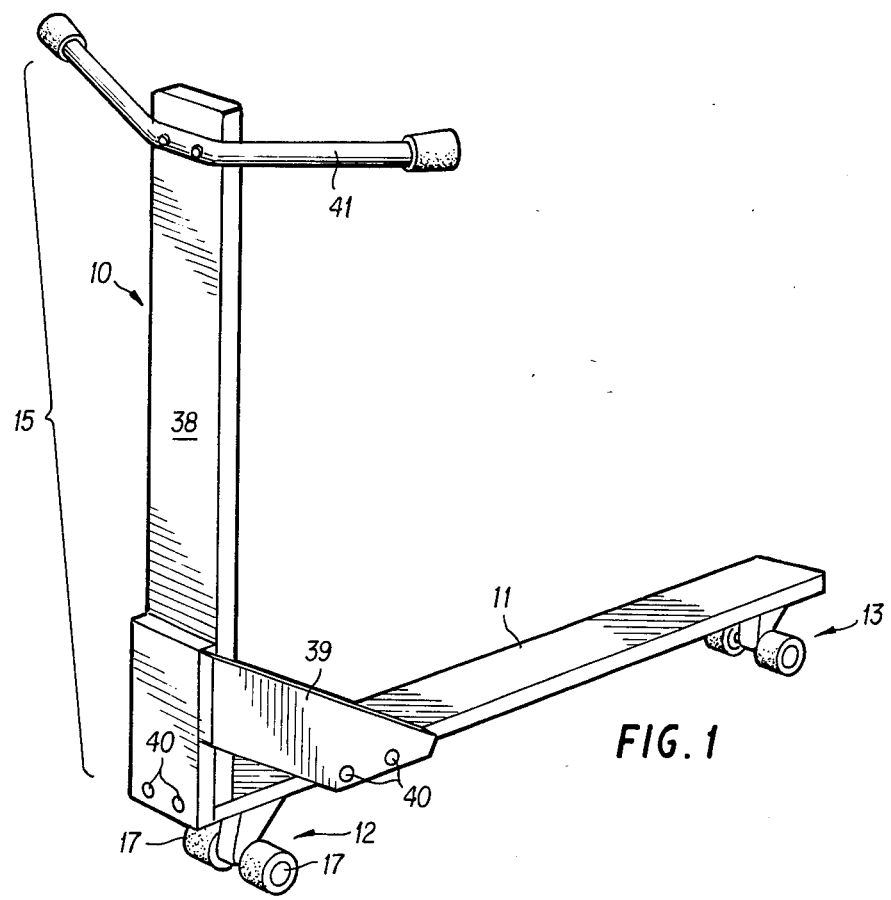
FIG. 1 is a perspective view of a design incorporated in the present scooterboard invention, wherein it is controlled by a non-swivelling steering column.

Referring now to the drawing in greater detail, reference numeral 10 represents a scooterboard according to the present invention having an elongated board 11 upon which a rider stands. The board is supported at its front and rear ends upon a pair of skate wheel trucks 12 and 13, respectively, the front skate wheel truck 12 being selectively controllable by the rider for directional steering.

Figure 2:
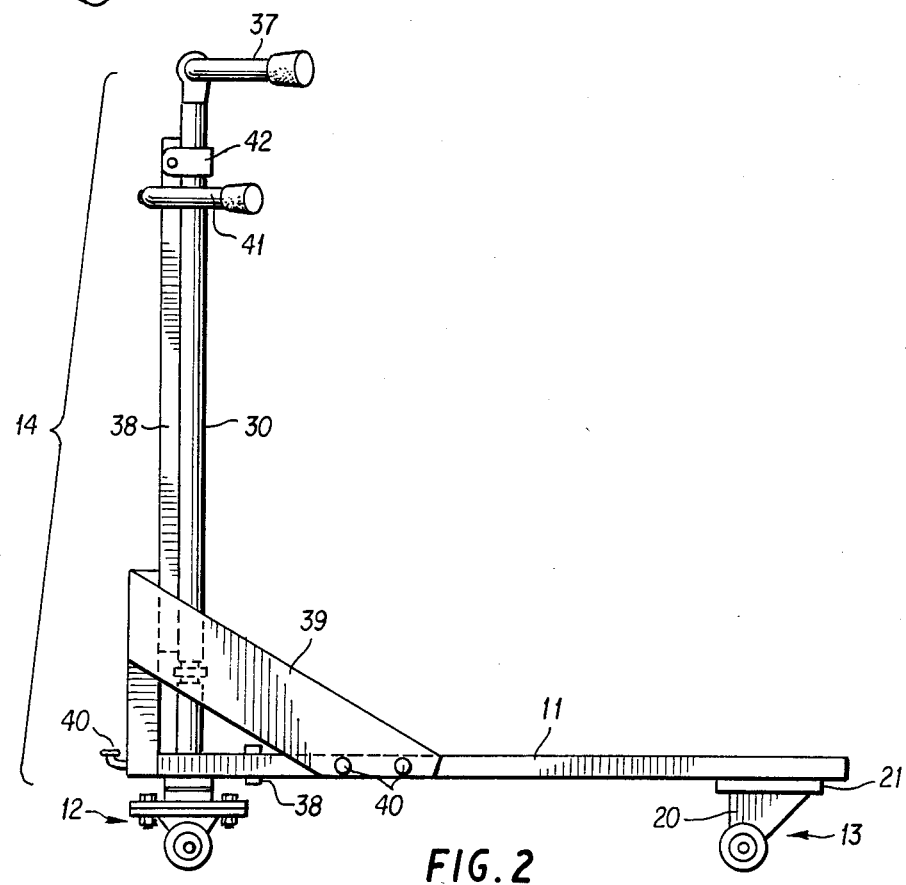
FIG. 2 is a side cross-sectional view of the fully assembled scooterboard, to be steered by a swivelling steering post.
Figure 3:
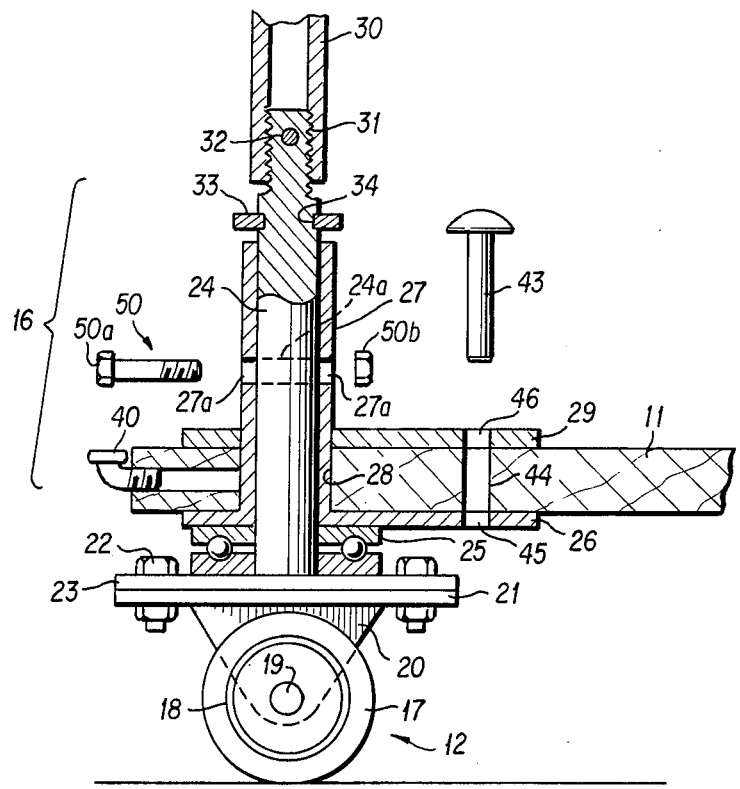
FIG. 3 is an enlarged cross-sectional view of the design of the present invention, wherein it is controlled by the swivelling post.
Figure 4:
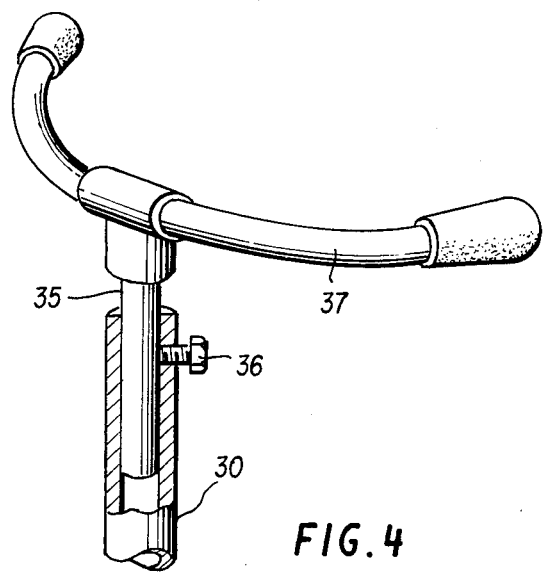
FIG. 4 is a perspective view, partly in cross section, of the steering post that is illustrated in FIG. 2.

In the present invention, the scooterboard 10 is adaptable for being selectively converted into either one of three different models 14, 15 or 16, as is evident by the different steering mechanisms for controlling the scooterboard as shown in FIG. 1, FIG. 2 and FIG. 3.

Each wheel truck 12, 13 includes two wheels 17, each wheel being fitted on ball bearings 18 and mounted on opposite ends of a shaft 19 supported at its center in a bracket 20. In the present invention, the rear wheel bracket is stationarily affixed to an underside of the board 11. The front wheel bracket 20 is welded to a rectangular plate 21, having a hole near each corner for receiving mounting bolts 22, passed through corresponding holes in an upper plate 23 so that plate 21 and upper plate 23 are secured together. The upper plate 23 is welded to the bottom of a vertical shaft 24 inserted through a thrust bearing 25. Bearing 25 is disposed between plate 23 and a lower flange 26 of a sleeve 27 inserted upwardly through a hole 28 of the board 11, so that the lower flange 26 bears against the underside of the board 11, while an upper flange 29, welded to the sleeve 27, bears against an upper side of the board 11.

The shaft 24 protrudes through an upper end of the sleeve 27 and is screw-threaded to a tubular steering post 30, as shown at 31. A transverse cross pin 32, extending through the post 30 and through the shaft 24, rigidly affixed the shaft 24 and post 30 together.

The shaft 24 is freely swivellable within the sleeve 27, swivelling of the shaft 24 producing a corresponding swivelling movement of the front skate wheel truck 12. The selectively lockable swivelling mechanism includes a shaft bore 24a and a sleeve bore 27a formed in the shaft 24 and the sleeve 27, respectively, in such a manner that the shaft bore 24a and the sleeve bore 27a are aligned only when the wheels 13 of the front skate wheel truck 12 are parallel to the longitudinal axis of the board 11, i.e., the shaft 19 of the front skate wheel truck 12 is perpendicular to the longitudinal axis of the board 11. With the shaft bore 24a aligned with the sleeve bore 27a, a removable locking means 50 is securedly inserted through the shaft bore 24a and sleeve bore 27a so that shaft 24 is restrained from swivelling within the sleeve 27. As shown in FIG. 3, the removable locking means 50 comprises an end-threaded bolt 50a which is inserted at one side of sleeve bore 27a and secured at the other side of sleeve bore 27a by means of locking nut 50b. It is to be understood that the removable locking means 50 as shown in FIG. 3 is by way of illustration only, and it is to be understood that any conventional removable locking means, such as a cotter pin, is within the scope of the teachings of the present invention.

A slip ring 33 is mounted in an annular groove 34 formed in the periphery of the shaft 24 between the adjacent ends of the sleeve 27 and post 30 to lock the front skate wheel truck 12 to the board 11 to prevent the wheel truck 12 from accidentally being disengaged from the scooterboard.

A fitting 35 is inserted in an upper end of the steering post 30 and is adjustably secured therein by a set screw 36 so as to accommodate different heights of riders grasping a handle bar 37 secured to the fitting 35.

A steering column 38, fitted with side brackets 39, is removably affixed to the board 11 by means of screws 40, the steering column having a handle bar 41. The steering column 38 is fixed, and does not swivel. A bracket 42 on the upper end of the steering column 38 supports the steering post 30 when affixed to the scooterboard to prevent it from wobbling.

Holes 44, 45, 46 are formed in the board 11, lower flange 26, and upper flange 29, respectively, and pin 43 is fixedly inserted through holes 44, 45, 46 to rigidly secure the shaft 27 to the board 11.

In operative use, it is now evident that steering of the scooterboard can be selectively controlled by a rider through use of the different steering mechanisms described hereinabove.

Model 14 of the invention (shown in FIG. 2) includes all of the above-described structure, except that removable locking means 50 is not inserted through shaft bore 24a and sleeve bore 27a, and the rider can steer the vehicle by turning the handle bar 37, so that the shaft 24 freely swivels in the sleeve 27 to control the directional movement of the front skate wheel truck 12.

Model 15 is formed by removing the cross pin 32, unscrewing the steering post 30, sliding it upward out of the bracket 42, so as to detach the steering post 30 from the vehicle. In this model, the rider holds the handle bar 41 of the steering column 38, and shifts his weight sidewardly, so as to produce a turning effect. In this model, the front skate wheel truck 12 is locked to prevent swivelling thereof by means of removable locking means 50 inserted through shaft bore 24a and sleeve bore 27a such that shaft 24 is restrained from swivelling with respect to sleeve 27.

In model 16, the steering column 38 and its braces 39 are additionally removed from the vehicle configuration of model 15 so that the rider has nothing extending upwardly for holding himself upon the vehicle, and he controls his steering by shifting his weight, the same as in the model 15, the selectively lockable swivelling mechanism keeping the front skate wheel truck 12 from swivelling.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A scooterboard including a board having an assembly hole formed in a front end thereof and a rear skate wheel truck fixedly mounted to an underside of said board at a rear end thereof, comprising:
    a selectively lockable swivelling assembly operatively associated with said assembly hole;
    a front skate wheel truck fixedly secured to said selectively lockable swivelling assembly and positioned on the underside of said board at said front end;
    a steering post assembly detachably affixed to said selectively lockable swivelling assembly such that when said selectively lockable swivelling assembly is in an unlocked state said front skate wheel truck is freely swivellable and said steering post assembly cooperates with said selectively lockable swivelling assembly to guidingly swivel said front skate wheel truck;
    a steering column assembly detachably and rigidly affixed to said front end of said board such that when said selectively lockable swivelling assembly is in a locked state said front skate wheel truck is prevented from swivelling and said scooterboard is guided by an operator grasping said steering column assembly and alternately exerting a sidewardly force on first and second sides of said board; and
    removable locking means operatively associated with said selectively lockable swivelling assembly for selectively cooperating with said selectively lockable swivelling assembly such that said selectively lockable swivelling assembly is positionable in said unlocked state and said locked state.

2. The scooterboard as claimed in claim 1 wherein said steering post assembly further comprises:
    a tubular steering post having internal threads formed therein at a first end proximal said selectively lockable swivelling assembly such that said internal threads cooperate with said selectively lockable swivelling assembly to detachably affix said tubular steering post thereto;
    a first handle bar including a fitting and wherein said fitting is adapted to cooperate with said tubular steering post such that when said selectively lockable swivelling assembly is in said unlocked state, guided swivelling movement of said first handle bar is transmitted by said tubular steering post to said selectively lockable swivelling assembly to guidingly swivel said front skate wheel truck; and
    adjusting means adapted to cooperate with said fitting and said tubular steering post for adjusting said first handle bar to a predetermined height above said board.

3. The scooterboard as claimed in claim 2 further comprising a cross pin adapted to cooperate with said tubular steering post and said selectively lockable swivelling assembly such that when said tubular steering post is detachably affixed to said selectively lockable swivelling assembly said cross pin rigidly affixes said tubular steering post to said selectively lockable swivelling assembly.

4. The scooterboard as claimed in claim 1 wherein said steering column assembly further comprises:
    a steering column;
    a first and second side brace rigidly secured to said steering column;
    securing means for rigidly securing said first side brace, said second side brace and said steering column to said front end of said board such that said steering column extends in a substantially perpendicular upright direction from said board; and
    a handle bar rigidly secured to said steering column distal said board.

5. The scooterboard as claimed in claim 1 wherein said selectively lockable swivelling assembly further comprises:

a sleeve operatively associated with said assembly hole, said sleeve including a transverse bore formed therethrough;

a shaft disposed within said sleeve and freely swivellable therein, said shaft having a first end adapted to be detachably affixed to said steering post assembly and a second end fixedly secured to said front skate wheel truck, and wherein said shaft further includes a transverse bore formed therethrough such that when said transverse bore of said shaft is aligned with said transverse bore of said sleeve and said removable locking means is operatively associated therewith said selectively lockable swivelling assembly is positioned in said locked state and said front skate wheel truck is prevented from swivelling; and bearing means for supporting the rotation of said front skate wheel truck, said bearing means positioned between said sleeve and said front skate wheel truck and having said shaft disposed therethrough.

6. The scooterboard as claimed in claim 1 wherein said removable locking means further comprises:

an end-threaded bolt adapted to be inserted through the transverse bore of said sleeve and the transverse bore of said shaft when aligned; and a nut adapted to cooperate with said end-threaded bolt to secure said end-threaded bolt to said sleeve such that said shaft is restrained from swivelling within said sleeve.

* * * * *